(12) United States Patent
Röhl et al.

(10) Patent No.: US 12,404,850 B2
(45) Date of Patent: Sep. 2, 2025

(54) METHOD FOR PRODUCING A MICROPUMP WITH MECHANICALLY BIASED DIAPHRAGM ACTUATOR

(71) Applicant: Fraunhofer-Gesellschaft zur Förderung der angewandten Forschung e.V., Munich (DE)

(72) Inventors: Siegfried Röhl, Munich (DE); Yuecel Congar, Munich (DE); Martin Wackerle, Munich (DE); Martin Richter, Munich (DE); Christoph Kutter, Munich (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 1213 days.

(21) Appl. No.: 17/097,826

(22) Filed: Nov. 13, 2020

(65) Prior Publication Data

US 2021/0060553 A1    Mar. 4, 2021

Related U.S. Application Data

(63) Continuation of application No. PCT/EP2019/062199, filed on May 13, 2019.

(30) Foreign Application Priority Data

May 18, 2018 (DE) ...................... 10 2018 207 858.0

(51) Int. Cl.
*B23P 15/00* (2006.01)
*B01L 3/00* (2006.01)
(Continued)

(52) U.S. Cl.
CPC ...... *F04B 43/046* (2013.01); *B01L 3/502707* (2013.01); *B01L 3/50273* (2013.01);
(Continued)

(58) Field of Classification Search
CPC .......................... Y10T 29/49236; B23P 15/00
See application file for complete search history.

(56) References Cited

U.S. PATENT DOCUMENTS 5,108,530 A     4/1992  Niebling, Jr. et al.
5,171,132 A    12/1992  Miyazaki et al.
                        (Continued)

FOREIGN PATENT DOCUMENTS

CN      1257006 A    6/2000
CN      1354823 A    6/2002
                     (Continued)

OTHER PUBLICATIONS

Qian Yuan, "Office Action for CN Application No. 201980044651. 1", Apr. 6, 2022, CNIPA, China.

*Primary Examiner* — Sarang Afzali
(74) *Attorney, Agent, or Firm* — Bridgeway IP Law Group, PLLC; Jihun Kim

(57) ABSTRACT

A method for producing a micropump includes, among others, a step of providing a substrate, wherein the substrate includes at least one pump diaphragm for the micropump. Additionally, a diaphragm actuator for moving the pump diaphragm is provided, wherein the diaphragm actuator is arranged in an holding device. The holding device is aligned relative to the substrate such that the diaphragm actuator is arranged opposite to the pump diaphragm and the pump diaphragm is deflected in the direction of the diaphragm actuator by means of a fluid pressure that is higher than the ambient pressure. Additionally, the diaphragm actuator is mounted on the pump diaphragm.

10 Claims, 6 Drawing Sheets

(51) Int. Cl.
  *B29C 65/48* (2006.01)
  *F04B 43/04* (2006.01)
(52) U.S. Cl.
  CPC .......... *B23P 15/00* (2013.01); *B29C 65/4835* (2013.01); *B01L 2200/12* (2013.01); *Y10T 29/49236* (2015.01)

(56) References Cited

U.S. PATENT DOCUMENTS

| | | |
|---|---|---|
| 6,284,436 B1 | 9/2001 | Ahn et al. |
| 7,191,503 B2 | 3/2007 | East |
| 9,410,641 B2 * | 8/2016 | Herz .................. F04B 43/043 |
| 10,343,404 B2 | 7/2019 | Han |
| 11,181,104 B2 * | 11/2021 | Shabanian .......... F04B 53/1087 |
| 2003/0002995 A1 | 1/2003 | Urano et al. |
| 2008/0073600 A1 | 3/2008 | Atkinson et al. |
| 2015/0330383 A1 | 11/2015 | Letailleur et al. |
| 2017/0226994 A1 | 8/2017 | Yuecel et al. |

FOREIGN PATENT DOCUMENTS

| | | | |
|---|---|---|---|
| CN | 1382909 A | 12/2002 | |
| CN | 104088778 A | 10/2014 | |
| CN | 106489026 A | 3/2017 | |
| DE | 3621332 A1 | 1/1988 | |
| DE | 10196634 T5 | 4/2005 | |
| DE | 102013202223 A1 | 8/2014 | |
| EP | 0435653 A1 | 7/1991 | |
| EP | 0371425 B1 | 3/1995 | |
| EP | 2542810 B1 | 4/2015 | |
| JP | 2011021610 A | 2/2011 | |
| JP | 2012026274 A | 2/2012 | |
| JP | 2018028265 A | 2/2018 | |
| TW | 612246 B | 1/2018 | |
| WO | 0028215 A1 | 5/2000 | |
| WO | 0222358 A1 | 3/2002 | |
| WO | WO-2018050534 A1 * | 3/2018 | ............ F04B 19/006 |

* cited by examiner

METHOD FOR PRODUCING A MICROPUMP WITH MECHANICALLY BIASED DIAPHRAGM ACTUATOR

CROSS-REFERENCE TO RELATED APPLICATIONS

This application is a continuation of copending International Application No. PCT/EP2019/062199, filed May 13, 2019, which is incorporated herein by reference in its entirety, and additionally claims priority from German Application No. 10 2018 207 858.0, filed May 18, 2018, which is also incorporated herein by reference in its entirety.

The invention relates to a method for producing a micropump having a diaphragm actuator, in particular a diaphragm actuator configured as bending converter, a holding device for holding a diaphragm actuator during the production of a micropump as well as a micropump having a diaphragm actuator, in particular a diaphragm actuator configured as bending converter.

BACKGROUND OF THE INVENTION

Micropumps are very small pumps having dimensions in the micrometer range. Their production significantly deviates from macroscopic pumps. Micropumps can be produced, for example, in MEMS technology. Such micropumps usually comprise deflectable diaphragms that can be deflected by means of diaphragm actuators. Deflecting the diaphragm generates a stroke of the micropump. Since the diaphragm actuator bends the diaphragm, such diaphragm actuators can also be referred to as bending converters. For example, bending converters acting according to the piezoelectric principle are known.

Micropumps having bending converters (e.g. piezo crystals) for deflecting the pump diaphragm can only operate to their full capacity when the death volume is minimized, independent of whether the micropumps are produced of metal, silicon or other materials.

For this, in micropumps operated with bending converters, the bending converter (e.g. piezo crystal) has to be mechanically biased so that the same can reach its optimum stroke.

For solving this object, EP 2 542 810 B 1 suggests a mechanical bias of the bending converter (piezo crystal) by applying electrical voltage. However, this has the following disadvantages:

The maximum electric bias is limited to approximately 2 MV/cm by the breakdown voltage of the piezo crystal.
The voltage supply and contacting are expensive and error-prone for large fields (arrays) that are needed for cost-effective production.

Therefore, when producing a micropump, it would be desirable to obtain a mechanical bias of the bending converter with the help of a method that is not subject to the stated restrictions.

SUMMARY

According to an embodiment, a method for producing a micropump may have the steps of: providing a substrate comprising at least one pump diaphragm for the micropump, providing a diaphragm actuator for moving the pump diaphragm and arranging the diaphragm actuator in a holding device, aligning the holding device relative to the substrate such that the diaphragm actuator is arranged opposite to the pump diaphragm, deflecting the pump diaphragm in the direction of the diaphragm actuator by means of a fluid pressure that is higher than the ambient pressure, and mounting the diaphragm actuator on the pump diaphragm.

According to another embodiment, a holding device for holding a diaphragm actuator during the production of a micropump according to an inventive method may have: a first recess with a first diameter, wherein the first recess comprises an edge area where the diaphragm actuator can be arranged and wherein the diaphragm actuator can be deflected at least partly into the first recess, a second recess with a second diameter, wherein the second recess comprises an edge area where a pump diaphragm of the micropump can be arranged and wherein the pump diaphragm can be deflected at least partly into the second recess, wherein the first diameter of the first recess is smaller than the second diameter of the second recess and the first recess is arranged within the second recess.

Another embodiment may have a micropump that can be produced by an inventive method.

The inventive method for producing a micropump includes, among others, a step of providing a substrate, wherein the substrate comprises at least one pump diaphragm for the micropump. The substrate can be a single or singulated micropump chip having a pump diaphragm. Alternatively, the substrate can be a wafer comprising one or several micropump structures having one pump diaphragm each, wherein the same are singulated after processing. Further, the method comprises a step of providing a diaphragm actuator that is configured to move or deflect the pump diaphragm. Here, the diaphragm actuator is inserted in a holding device. Further, the method includes a step of aligning the holding device relative to the substrate such that the diaphragm actuator is arranged opposite to the pump diaphragm. Aligning the holding device can take place prior to or after inserting the diaphragm actuator into the holding device. Prior to or after aligning the holding device, in which the diaphragm actuator is arranged, the pump diaphragm is deflected in the direction of the diaphragm actuator by means of a fluid pressure that is higher than the ambient pressure. This means a pressurized fluid comprises an overpressure with respect to the ambient atmospheric pressure. The fluid used for this can be a gas, in particular compressed air, but also liquid. The method further comprises a step of mounting the diaphragm actuator on the pump diaphragm. Here, the diaphragm actuator can be mounted on the pump diaphragm deflected by means of the fluid pressure or the diaphragm actuator can be mounted on the still undeflected pump diaphragm, wherein then the pump diaphragm can subsequently be deflected together with the diaphragm actuator mounted thereon by means of the fluid pressure.

According to an embodiment, the diaphragm actuator can be arranged in the holding device such that the same forms a dome-shaped deformation that is curved in the same direction as the deflected pump diaphragm, whereby the deformed diaphragm actuator is mechanically biased. This means both the pump diaphragm as well as the diaphragm actuator have a dome-shaped deformation each, both curving in the same direction. Advantageously, the two dome-shaped deformations have approximately the same dimensions. In that way, the diaphragm actuator mechanically biased in a dome shape can be arranged on the diaphragm deflected in a dome shape.

According to an embodiment, the step of arranging the diaphragm actuator in the holding device can comprise inserting the diaphragm actuator in the holding device as well as applying a mechanical force on the diaphragm actuator, such that the diaphragm actuator inserted in the holding device is deformed in a direction away from the pump diaphragm and thereby mechanically biased. This means the diaphragm actuator can, for example, be pressed into the holding device, by means of a compressive force, or can also be pulled into the holding device by means of a tensile force. By applying the respective force, the diaphragm actuator is deformed and thereby mechanically biased.

According to an embodiment, the step of arranging the diaphragm actuator in the holding device can comprise generating a negative pressure between the holding device and the diaphragm actuator, whereby the diaphragm actuator is sucked into the holding device by means of the negative pressure and is deformed in a direction away from the pump diaphragm and thereby mechanically biased. Such a negative pressure can, for example, be generated by means of a vacuum pump or the same. For this, the holding device can comprise, for example, openings or holes through which the air between the holding device and the diaphragm actuator arranged therein can be evacuated. Thereby, the diaphragm actuator is drawn and sucked into the holding device.

According to an embodiment, the step of arranging the diaphragm actuator in the holding device can comprise applying electrical voltage to the diaphragm actuator such that the same is deformed in a direction away from the pump diaphragm and thereby mechanically biased. This applies in particular to diaphragm actuators that are electrically deformable, such as piezo actuators. Advantageously, applying the voltage to the diaphragm actuator can be performed in combination with the above-stated negative pressure for sucking the diaphragm actuator in the holding device.

According to an embodiment, the pump diaphragm can be deflected so far in the direction of the diaphragm actuator by means of the fluid pressure that the pump diaphragm clings to the diaphragm actuator that is inserted in the holding device and deformed as well as mechanically biased. This means the deflected diaphragm comprises approximately the same deformation having approximately the same dimensions as the mechanically biased diaphragm actuator. Both can, for example, comprise a dome-shaped curve. This can take place by deflecting the pump diaphragm so far until the same curves into the opposite holding device and clings to the same. Here, the pump diaphragm takes the shape of the holding device. The diaphragm actuator is arranged between the holding device and the pump diaphragm, such that the deflected pump diaphragm clings directly to the diaphragm actuator and adapts itself not only to the shape of the holding device, but at the same time also to the shape of the diaphragm actuator.

According to an embodiment, the pump diaphragm can be deflected in the direction of the diaphragm actuator by means of the fluid pressure such that the pump diaphragm touches the diaphragm actuator inserted in the holding device and the pump diaphragm and the diaphragm actuator are deflected together, wherein the diaphragm actuator is deformed and mechanically biased. This means the diaphragm actuator can be arranged already in the holding device but not yet deformed. The pump diaphragm can touch the diaphragm actuator while the same is deflected and can deflect the same as well. The pump diaphragm swells like a balloon and takes the diaphragm actuator along. By the common deflection, the pump diaphragm and the diaphragm actuator are pressed into the holding device and can adopt the shape of the holding device.

According to an embodiment, the step of providing the substrate can comprise arranging the substrate on a substrate holder, providing a fluid-tight connection between the substrate and the substrate holder and providing a fluidic connection between the substrate holder and the pump diaphragm, as well as generating the fluid pressure within the fluidic connection such that the pressurized fluid flows through the fluidic connection to the pump diaphragm and the pump diaphragm is deflected in the direction of the diaphragm actuator by means of the fluid pressure. The fluid-tight connection between the substrate holder and the substrate can take place, for example, by means of circumferential seals such as rubber ring seals. Thereby, compressed air can be introduced between the substrate and the substrate holder. Additionally, the substrate can comprise fluid channels that extend from a side facing the substrate holder up to the pump diaphragm. In that way, a fluidic connection between the substrate holder and the pump diaphragm can be established. The compressed air between the substrate holder and the substrate can thereby flow to the pump diaphragm and can deflect the same.

According to an embodiment, the fluid pressure can comprise an overpressure with respect to the ambient pressure of 0.5 bar to 5 bar or of 0.5 bar to 3 bar or of 1 bar to 2 bar. An overpressure of up to 5 bar can be advantageous to deflect, for example, relatively rigid metallic pump diaphragms. More flexible pump diaphragms, such as pump diaphragms of silicon can already be deflected to a sufficient extent with an overpressure of approximately 1 bar to 2 bar.

According to an embodiment, the step of mounting the diaphragm actuator on the pump diaphragm can comprise arranging joining means on the side of the pump diaphragm facing the diaphragm actuator and/or on the side of the diaphragm actuator facing the pump diaphragm. The joining means can, for example, be an adhesive, in particular a thermosetting adhesive or a solder. The latter can be used in particular in pump diaphragms made of silicon to bond the diaphragm actuator to the silicon diaphragm.

According to an embodiment, the joining means can be thermosetting joining means and the step of mounting the diaphragm actuator on the pump diaphragm actuator to the pump diaphragm can comprise heating the diaphragm actuator and/or the pump diaphragm up to below the Curie temperature of the diaphragm actuator for thermally activating the joining means. In particular, heating can take place up to approximately 20% or even up to 10% below the Curie temperature. Heating can take place, for example, by means of a heating device in the holding device. For this, it would be possible to arrange heating wires or the same on the holding device. By heating the heating device, the diaphragm actuator arranged therein and also the pump diaphragm applied to the diaphragm actuator can be heated together. Thereby, the joining means arranged between the diaphragm actuator and the pump diaphragm is activated and a connection between diaphragm actuator and pump diaphragm results.

According to an embodiment, the step of providing the substrates can comprise providing a substrate configured as wafer, wherein the wafer comprises a plurality of pump diaphragms for a respective plurality of micropumps that can be produced in parallel in the wafer compound by means of the method. This means the substrate can be a wafer or a wafer substrate. In the wafer, a plurality, i.e. at least 2, advantageously 30 and more, in particular 32 or 36 individual micropump bodies or micropump structures having one pump diaphragm each can be provided. By means of the inventive method, one micropump each can be produced of each micropump structure, i.e. one diaphragm actuator can be arranged on each pump diaphragm in the manner described herein. The advantage is that the method steps described herein can be performed in parallel in the wafer compound or on wafer level, such that not only a single micropump but a plurality of micropumps can be produced simultaneously. The micropumps that can be produced in that way can subsequently be singulated from the wafer such that individual micropump chips can be obtained.

A further aspect of the present invention relates to a suitable tool to perform the method described above. Accordingly, an inventive holding device for holding a diaphragm actuator during the production of a micropump is suggested. The holding device comprises, among others, a first recess having a first diameter, wherein the first recess comprises an edge area where the diaphragm actuator can be arranged and wherein the diaphragm actuator can be deflected at least partly into the first recess. This means the diaphragm actuator can be arranged on the edge or the edges of the first recess, such that the diaphragm actuator is only supported on this edge area. In the area of the first recess itself, the diaphragm actuator is suspended, i.e. the diaphragm actuator is not supported. Thus, the diaphragm actuator can extend into the first recess when the same is deflected. Here, the diaphragm actuator can develop a deformation in the shape of a dome-shaped curve. Additionally, the inventive holding device comprises a second recess having a second diameter, wherein the second recess comprises an edge area where a pump diaphragm of the micropump can be arranged and wherein the pump diaphragm can be deflected at least partly into the second recess. This means the pump diaphragm can be arranged on the edge or the edges of the second recess, such that the same is only supported on this edge area. In the area of the second recess itself, the pump diaphragm is suspended, i.e. the pump diaphragm is not supported. Thus, the pump diaphragm can extend into the second recess when the same is deflected. Here, the pump diaphragm can develop a deformation in the shape of a dome-shaped curve. According to the invention, the first diameter of the first recess is smaller than the second diameter of the second recess and the first recess is arranged within the second recess. The inventive apparatus offers the advantage that both the pump diaphragm as well as the diaphragm actuator can be processed simultaneously in the holding device. Due to the fact that the pump diaphragm and the diaphragm actuator each are supported only on the edges of the first or second recess, the pump diaphragm or the diaphragm actuator can be easily deflected, for example by overpressure acting on the pump diaphragm or the diaphragm actuator, such that this overpressure presses the pump diaphragm or the diaphragm actuator into the respective recess. The recess may have no floor, i.e. comparable to a tube, wherein the pump diaphragm or the diaphragm actuator can be deflected into the tube. In the inventive holding device, the second recess is arranged within the first recess in radial direction. Accordingly, this could be compared to two interleaved tubes.

According to an embodiment, the edge area of the first recess can be spaced apart from the edge area of the second recess in a depth direction in which the pump diaphragm and/or the diaphragm actuator can be deflected into the respective recess. This means, while the second recess is arranged within the first recess in radial direction, the edge area of the second recess can be spaced apart from the first recess in axial direction. The edge area of the second recess can be offset to the inside, i.e. the edge area of the second recess can be spaced apart from the edge area of the first recess in a direction corresponding to the direction of deformation or deflection of the pump diaphragm or the diaphragm actuator.

According to an embodiment, the edge area of the first recess can be arranged in a movable manner relative to the edge area of the second recess, such that a spacing in depth direction between the edge area of the first recess and the edge area of the second recess is variable. This means the above stated axial offset between the edge area of the first recess and the edge area of the second recess can be adjusted relative to each other by the mobility of the two edge areas.

According to an embodiment, the spacing in the depth direction between the edge area of the first recess and the edge area of the second recess can be selected such that a pump diaphragm arranged on the edge area of the second recess touches a diaphragm actuator arranged on the edge area of the first recess in a deflected state. This means the axial offset is selected such that the pump diaphragm does not touch the diaphragm actuator in a non-deflected state and that the pump diaphragm touches the diaphragm actuator in its deflected state.

According to an embodiment, the edge area of the first recess and/or the edge area of the second recess can be configured in a ring shape. A ring-shaped edge area is characterized in that that the same forms a closed ring. The geometric shape of the ring-shaped edge area can be round or square. The edge area of the first recess and/or the edge area of the second recess can be configured in a circular and in a ring shape. Thereby, the pump diaphragm or the diaphragm actuator can be arranged completely and particularly advantageously on the edge areas and can be deflected into the recess.

According to a further embodiment, the holding device can comprise a plurality of first recesses and a plurality of second recesses, wherein the holding device can be configured to hold a plurality of diaphragm actuators on wafer level during production of a respective plurality of micropumps. This means the inventive holding device is configured to process wafers having a plurality of micropump structures. In that way, a plurality of micropumps can be produced on wafer level by means of the inventive holding device. Here, the holding device can hold a plurality of diaphragm actuators, such that each diaphragm actuator can be arranged on one pump diaphragm each of a respective plurality of micropump structures.

A further aspect of the present invention relates to a micropump that can be produced by the above-stated method or by using the above-stated holding device.

BRIEF DESCRIPTION OF THE DRAWINGS

Embodiments of the present invention will be detailed subsequently referring to the appended drawings, in which.

DETAILED DESCRIPTION OF THE INVENTION

In the following, embodiments will be described in more detail with reference to the figures, wherein elements having the same or similar function are provided with the same reference numbers.

Additionally, a piezo actuator is described herein as a non-limiting example for a deflectable diaphragm actuator. Since the deformation or the mechanical bias of the diaphragm actuator, according to the invention, does not primarily take place by applying electrical voltage as described in conventional technology, other types of diaphragm actuators can also be used.

Additionally, the inventive holding device will exemplarily also be referred to as a tool below.

Figure 1:
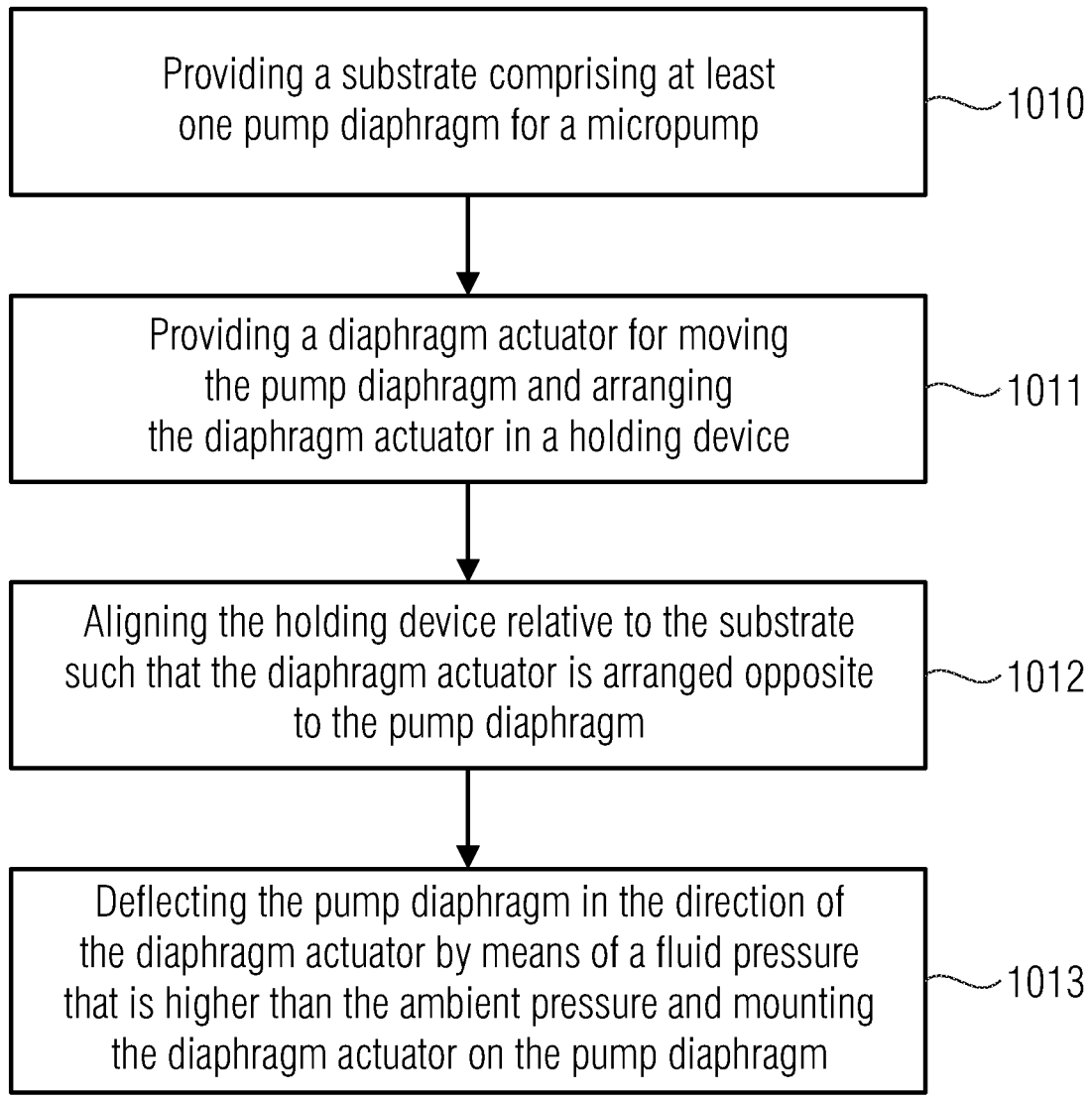
FIG. 1 is a block diagram of an inventive method according to an embodiment.

FIG. 1 shows a flow diagram of an inventive method for producing a micropump. Such a micropump comprises dimensions in the micrometer range and can be produced, for example, in MEMS design.

In block 1010, a substrate comprising at least one pump diaphragm for the micropump is provided. The substrate can, for example, be a wafer. The wafer can comprise silicon, for example, or can be produced of silicon, for example.

In block 1011, a diaphragm actuator for moving the pump diaphragm is provided and this diaphragm actuator is arranged in a holding device, for example inserted into the same.

In block 1012, the holding device is aligned relative to the substrate such that the diaphragm actuator is arranged opposite to the pump diaphragm.

In block 1013, the pump diaphragm is deflected in the direction of the diaphragm actuator by means of a fluid pressure that is higher than the ambient pressure. Here, the fluid pressure acts directly on the pump diaphragm and deflects the same towards the diaphragm actuator such that the pump diaphragm moves in the direction of the diaphragm actuator caused by the fluid pressure. The fluid generating the fluid pressure can be a gas or alternatively a liquid.

In a further step, the diaphragm actuator is mounted on the pump diaphragm. This step can take place after deflecting the pump diaphragm, such that the diaphragm actuator is mounted on the deflected pump diaphragm. However, this step can take place prior to deflecting the pump diaphragm, such that the pump diaphragm is subsequently deflected together with the diaphragm actuator mounted thereon. This aims to mechanically bias the diaphragm actuator and/or the pump diaphragm.

Figure 2A:
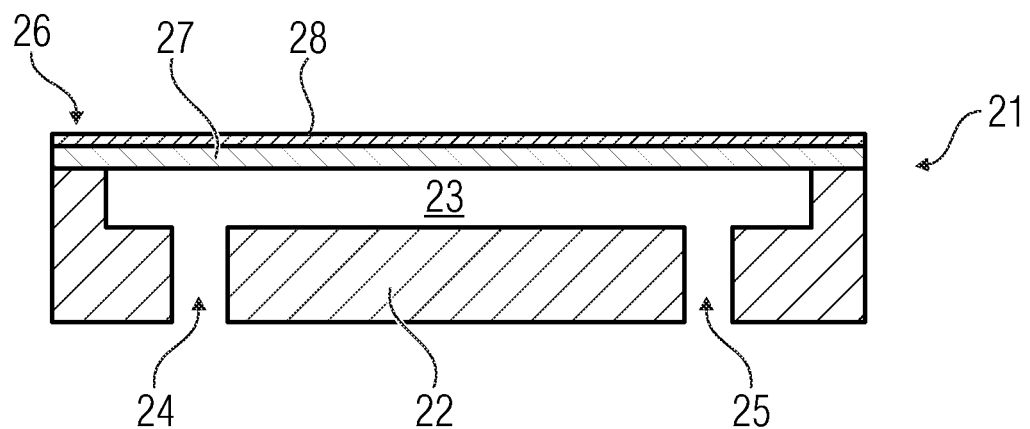
FIG. 2A is a lateral sectional view of a micropump that can be produced by applying an inventive method.
Figure 2B:
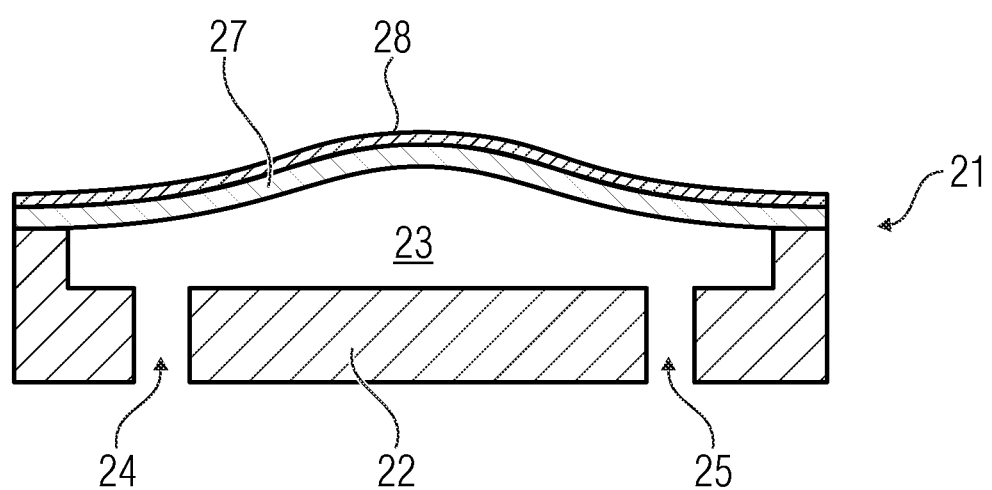
FIG. 2B is a further lateral sectional view of a micropump that can be produced by applying an inventive method.

FIGS. 2A and 2B show a representational image of a micropump 21 produced with the inventive method. The micropump 21 comprises a substrate 22. The substrate 22 can, for example, be a silicon substrate.

A pump chamber 23 is configured in the substrate 22. Further, the substrate 22 comprises an inlet 24 and an outlet 25 that both lead into the pump chamber 23. Fluid can flow into the pump chamber 23 through the inlet 24. The fluid can leave the pump chamber 23 again through the outlet 25.

A pump diaphragm 27 is arranged on a top surface 26 of the substrate 22. The pump diaphragm 27 is arranged opposite to the pump chamber 23. The pump diaphragm 27 is movable or flexible. A diaphragm actuator 28 is arranged on the pump diaphragm 27 on a side of the pump diaphragm 27 facing away from the substrate 22. The diaphragm actuator 28 is configured to operate, i.e. to deflect the pump diaphragm 27.

If the diaphragm actuator 28 deflects the pump diaphragm 27 to the top, i.e. in a direction away from the substrate 22 (FIG. 2B), the micropump 21 performs a suction stroke and sucks fluid through the inlet 24. In the suction stroke, the pump diaphragm 27 and the diaphragm actuator 28 have a dome-shaped deformation. If the diaphragm actuator 28 deflects the pump diaphragm 27 to the bottom, i.e. in a direction towards the substrate 22 (FIG. 2A), the micropump 21 performs a pressure stroke and expels the sucked-in fluid through the outlet 25.

In a non-operated state, the micropump 21 is in the position illustrated in FIG. 2B. Here, the diaphragm actuator 28 is mechanically biased, such that the diaphragm actuator 28 deflects the diaphragm 27 in a direction away from the substrate 22.

When producing the micropump 21 with the inventive method, the above-described pump mechanism can be reversed. This means a fluid within the pump chamber 23 can deflect the pump diaphragm 27. When the fluid has a pressure that is higher than the ambient atmospheric pressure, the pump diaphragm 27 is deflected in a direction away from the substrate 22, such that the pump diaphragm 27 and the diaphragm actuator 28 have the above-mentioned dome-shaped deformation.

Figure 3A:
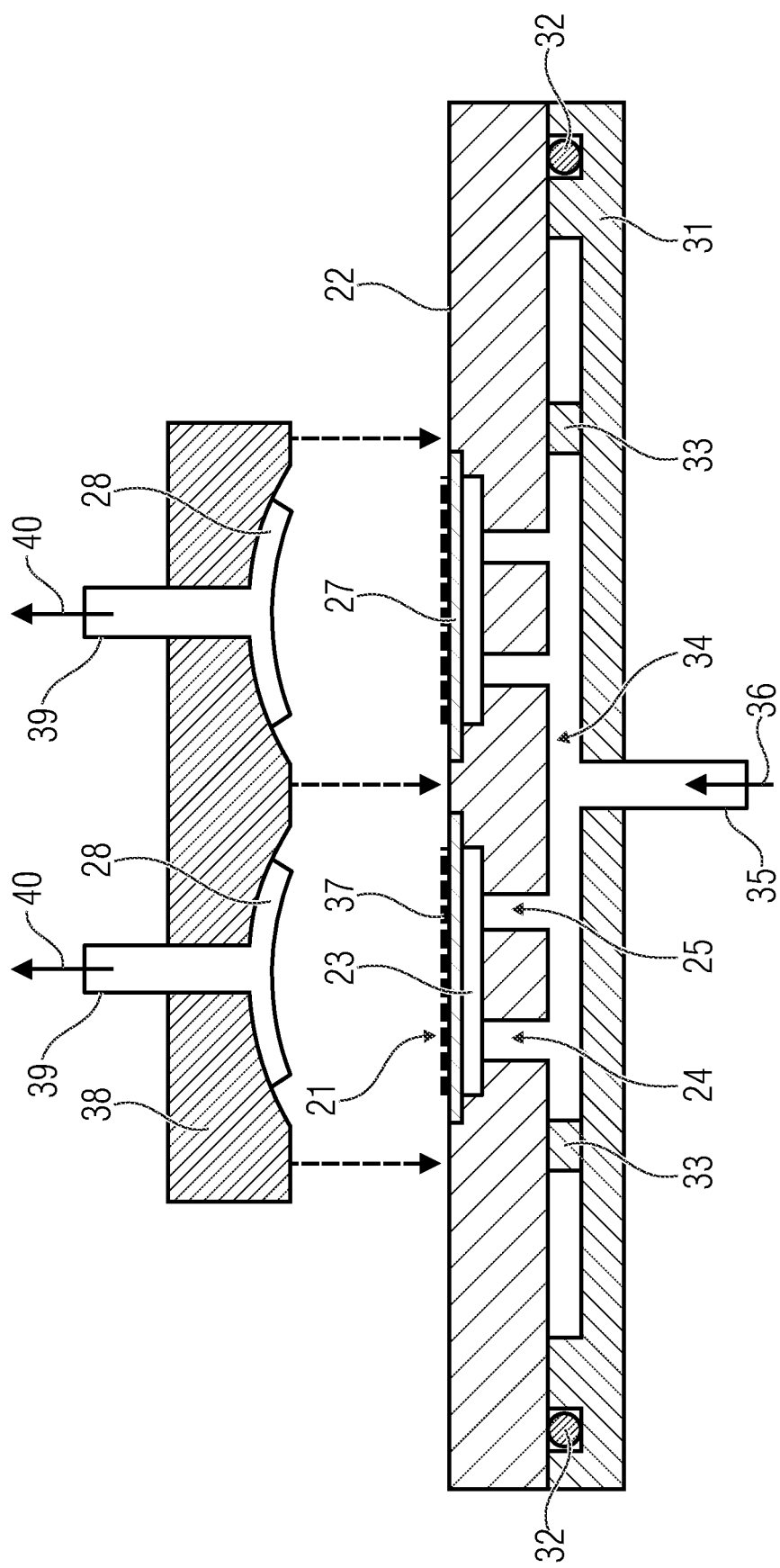
FIG. 3A is a lateral sectional view of a substrate arranged on a substrate holder and an inventive holding device for holding a diaphragm actuator according to an embodiment.
Figure 3B:
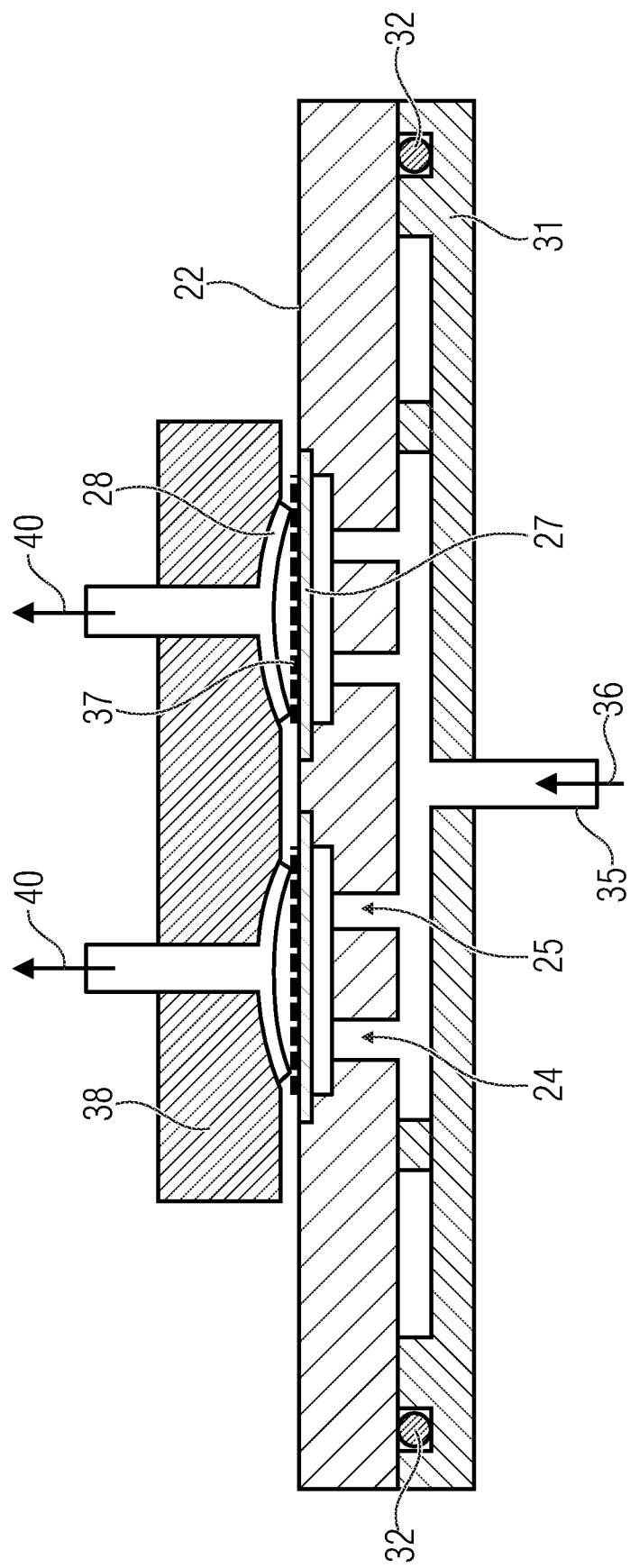
FIG. 3B is a further lateral sectional view of a substrate arranged on a substrate holder and an inventive holding device for holding a diaphragm actuator according to an embodiment.

FIGS. 3A and 3B show a representational illustration of a tool that can be used for mass production of micropumps applying the inventive method. This is merely a non-limiting example of an embodiment of the inventive method or the inventive holding device.

FIG. 3A shows a substrate holder 31. The substrate holder 31 can, for example be a wafer holder, for example a so-called chuck. Accordingly, the substrate 22 can be a wafer substrate, wherein several micropump structures of the above type can be configured in the wafer substrate that can subsequently be singulated as micropump chips. FIG. 3A exemplarily shows the micropump 21.

The substrate 22 is arranged on the substrate holder 31. A seal 32 is arranged between the substrate 22 and the substrate holder 31, which provides a fluid-tight connection between the substrate 22 and the substrate holder 31. The seal 10 can, for example, be a rubber seal. The seal 32 can, for example, be configured in a fully circumferential manner.

The substrate holder 31 can comprise a recess 32. Supporting structures 33 can be provided in the recess 34 to mechanically support and stabilize the substrate 22. The recess 34 can be provided at least in an area of the inlet and outlet 24, 25 of the respective micropump 21. Additionally, the substrate holder 31 can comprise a fluid terminal 35 leading into the recess 34. When the substrate 22 is arranged on the substrate holder 31, the recess 34 can form a space between the substrate holder 31 and the substrate 22 arranged thereon.

A fluid, symbolized by the arrow 36, can flow into the recess 34 through the fluid terminal 35. Accordingly, the fluid 36 can flow through the recess 34 and through the inlet 24 of the micropump 21 into the pump chamber 23 of the micropump 21, such that the fluid 36 can deflect the pump diaphragm 27. Accordingly, a fluidic connection between the substrate holder 31 and the pump diaphragm 27 is provided.

As described in more detail below, overpressure can be generated within this fluidic connection, such that the pressurized fluid 36 flows through the fluidic connection to the pump diaphragm 27 and the pump diaphragm 27 is deflected in the direction of the diaphragm actuator 28 by means of the fluid pressure.

Here, the fluid pressure can have an overpressure with respect to the ambient pressure of 0.5 bar to 5 bar or of 0.5 bar to 3 bar or of 1 bar to 2 bar.

FIG. 3A shows an inventive holding device 38. The holding device 38 is configured to hold a diaphragm actuator 28 at least temporarily when producing a micropump 21.

In the embodiment shown herein, the diaphragm actuator 28 can be arranged in the holding device 38 such that the same forms a dome-shaped deformation that curves in the same direction as the pump diaphragm 27 when the same is deflected, for example, by means of a fluid pressure as described above. By the dome-shaped deformation, which can also be referred to as curve, the diaphragm actuator 28 deformed in that way is mechanically biased.

The diaphragm actuator 28 can be so flexible that the same curves by itself during insertion in the holding device 38, for example, when the diaphragm actuator 28 is configured to be very thin.

The diaphragm actuator 28 can also be inserted into the holding device 38 by applying mechanical force. For example, the diaphragm actuator 28 can be pressed into the holding device 38.

Alternatively or additionally, as schematically shown in FIG. 3A, a negative pressure lower than the ambient atmospheric pressure can be generated between the holding device 38 and the diaphragm actuator 28, whereby the diaphragm actuator 28 is sucked into the holding device 38 by means of the negative pressure and is deformed in a direction away from the pump diaphragm 27 and thereby mechanically biased. This negative pressure is symbolized by arrows 40. For this, the inventive holding device 38 can comprise a fluid terminal 39 that leads into a contact area where the diaphragm actuator 28 comes into contact with the holding device 38. A vacuum pump can be connected to the fluid terminal 39.

Alternatively or additionally, electrical voltage can be applied to the diaphragm actuator 28, such that the same is deformed in a direction away from the pump diaphragm 27 and thereby mechanically biased.

The holding device 38 is aligned relative to the substrate 22 such that the diaphragm actuator 28 inserted therein is opposite to a pump diaphragm 27 arranged on the substrate 22. Subsequently, the holding device 38 can be traversed to the bottom, i.e. in the direction of the substrate 22, to bring the diaphragm actuator 28 and the pump diaphragm 27 into spatial proximity. This is illustrated in FIG. 3B.

The mechanically biased diaphragm actuator 28 is now opposite to the pump diaphragm 27 and is connected to the pump diaphragm 27. Optionally, joining means 27 can be provided between the diaphragm actuator 28 and the pump diaphragm 27. This can, for example, be an adhesive.

As mentioned above, the pump diaphragm 27 can be deflected so far in the direction of the diaphragm actuator by means of the fluid pressure 36 that the pump diaphragm 27 clings to the diaphragm actuator 28 that is inserted in the holding device 38 and deformed as well as mechanically biased.

Figure 4:
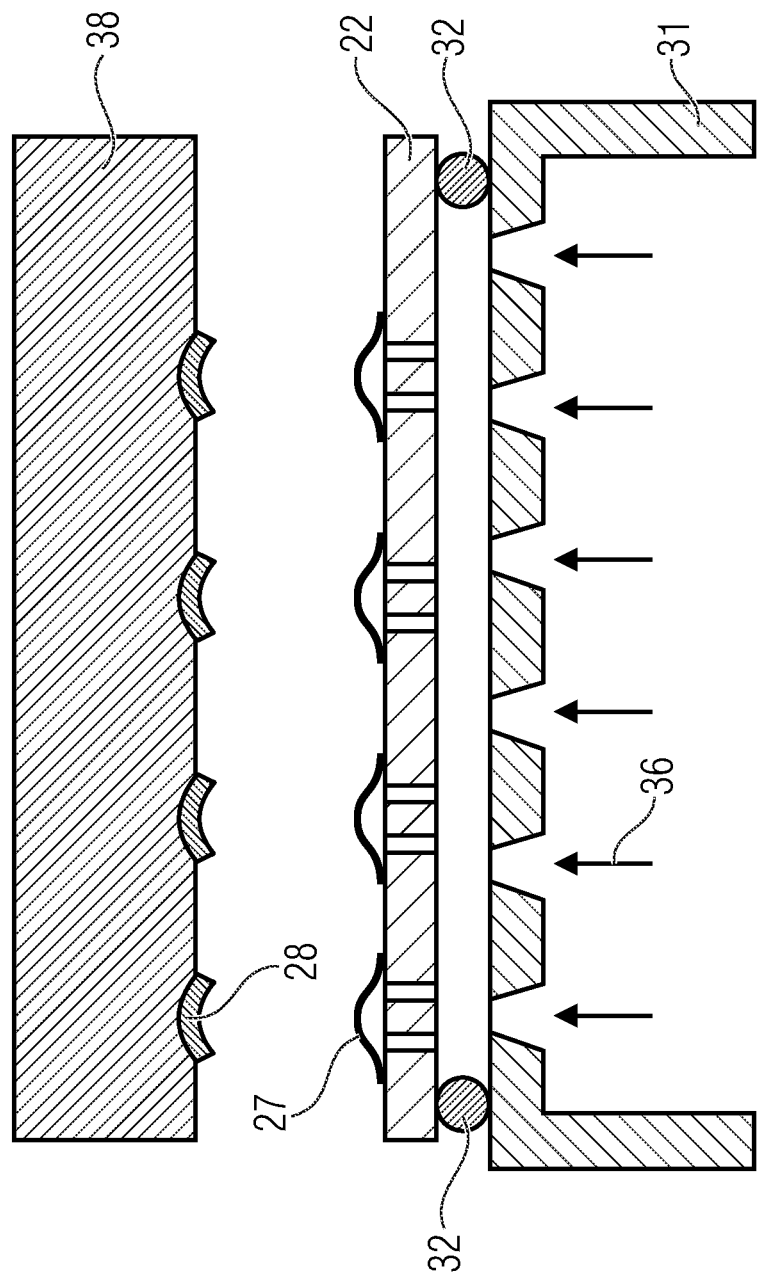
FIG. 4 is a further lateral sectional view of a substrate arranged on a substrate holder and an inventive holding device for holding a diaphragm actuator according to an embodiment.

This is shown schematically in FIG. 4. Here, the substrate holder 31, the substrate 22 arranged thereon and the seal 32 arranged inbetween can be seen. The overpressure 36 reaches the respective pump diaphragm 27 through the inlet of the respective micropump structure and deflects the same in a direction away from the substrate 22.

The respective diaphragm actuators 28 are arranged in the holding device 38 arranged on the opposite side. Both the pump diaphragm 27 as well as the diaphragm actuator 28 have a dome-shaped deformation, for example, a curve. Subsequently, the holding device 38 can be traversed in the direction of the substrate 22, such that the deflected pump diaphragm 27 clings to the diaphragm actuator 28 that is inserted in the holding device 38 and deformed as well as mechanically biased.

In the example shown in FIG. 3B, the order can deviate from the example shown in FIG. 4. In FIG. 3B, for example, first, the holding device 38 can be traversed in the direction of the substrate 22, such that the diaphragm actuator 28 inserted therein is opposite to a not yet deflected pump diaphragm 27. Subsequently, the pump diaphragm 27 can be deflected by means of the overpressure 36, such that the deflected pump diaphragm 27 clings to the diaphragm actuator 28 that inserted in the holding device 38 and deformed as well as mechanically biased. The advantage is that the deflected pump diaphragm 27 can be supported in the holding device 38 while connecting to the diaphragm actuator 28.

In an alternative embodiment, it is possible that the diaphragm actuator 28 is already inserted in the holding device 38, but not yet deformed and mechanically biased. Instead, only the pump diaphragm 27 can be actively deflected and take the diaphragm actuator 28 along, i.e. the diaphragm actuator 28 is deflected passively by the pump diaphragm 27. Accordingly, the pump diaphragm 27 can be deflected in the direction of the diaphragm actuator 28 by means of the fluid pressure 36, such that the pump diaphragm 27 touches the diaphragm actuator 28 that is inserted in the holding device 38 but not yet mechanically biased, and the pump diaphragm 27 and the diaphragm actuator 28 are deflected together, whereby the diaphragm actuator 28 is deformed and mechanically biased.

As mentioned above, optional joining means 37 can be provided between the pump diaphragm 27 and the diaphragm actuator 28. The optional joining means 37 for joining the deformed and mechanically biased diaphragm actuator 28 with the pump diaphragm 27 can be, for example, a thermosetting adhesive. In this case, in one embodiment, the holding device 38 can comprise means for heating the diaphragm actuator 28. For example, the holding device 38 can comprise heating wires by means of which the diaphragm actuator 28 can be heated. The heat introduced into the diaphragm actuator 28 is dissipated by the diaphragm actuator 28 to the joining means 37 that is then cured. Thereby, however, heat is also dissipated to the pump diaphragm 27.

Here, the means for heating the diaphragm actuator 28 should be configured such that while thermally activating the joining means 37, the diaphragm actuator 28 and/or the pump diaphragm 27 are merely heated up to below their respective Curie temperature. Thereby, damages to the pump diaphragm 27 and, in particular, to the diaphragm actuator 28 are prevented, which can thereby lose its mechanical bias.

The joining means 37 can be deposited on the side of the pump diaphragm 27 facing the diaphragm actuator 28 and/or on the side of the diaphragm actuator 28 facing the pump diaphragm 27. Additionally, deflection of the pump diaphragm 27 can take place until the joining means 37 is cured to permanently realize the mechanical bias of the diaphragm actuator 28.

Additionally, deflecting the pump diaphragm 27 can take place at individual micropumps or also in the wafer compound, i.e. in a substrate 27 comprising several micropumps that are not yet singulated as shown exemplarily in FIGS. 3A and 3B. Here, several diaphragm actuators can be mounted in parallel. The same applies to cartridges where micropumps are mounted in parallel.

As indicated in FIGS. 3A, 3B and 4, the holding device 38 can have a depression into which the diaphragm actuator 28 is inserted. This depression can be configured as curved floor and can have a spherical cap shape. The diaphragm actuator 28 clings to this curved spherical cap-shaped floor and hence takes on the shape of the curved spherical cap-shaped floor. This curved spherical cap-shaped floor can also be referred to as a contact portion of the holding device 38 since the diaphragm actuator 28 comes into contact with the holding device 38 at this contact portion.

Figure 5B:
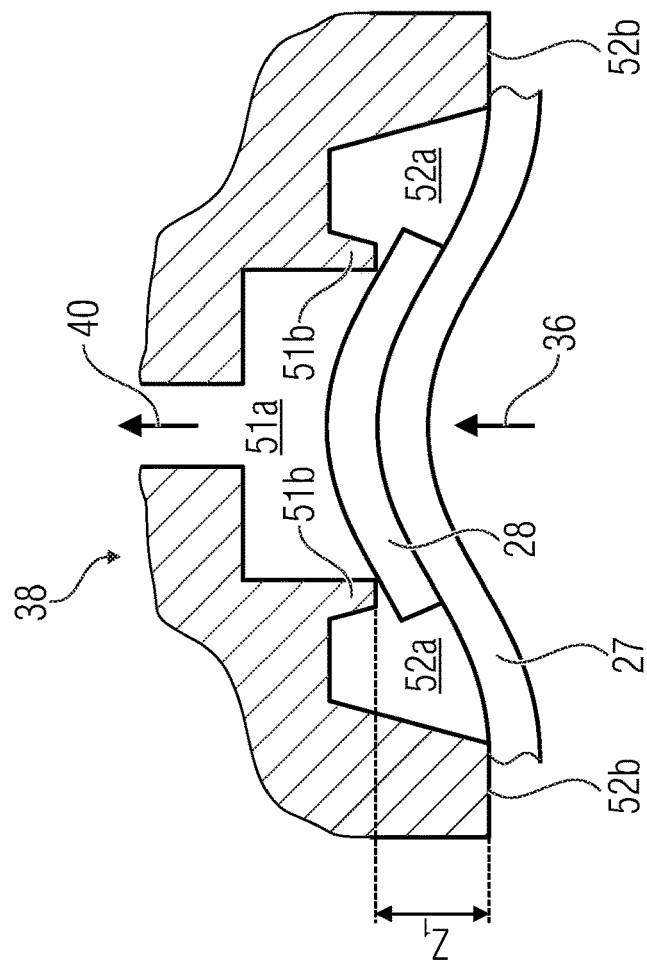
FIG. 5B is a lateral sectional view of an inventive holding device for holding a diaphragm actuator according to an embodiment.
Figure 5A:
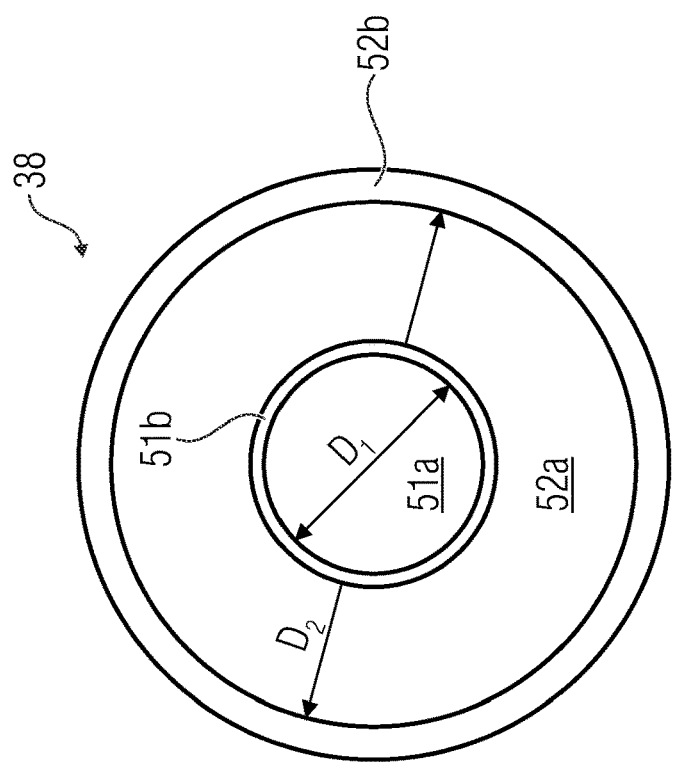
FIG. 5A is a top view of the bottom of an inventive holding device for holding a diaphragm actuator according to an embodiment.

FIGS. 5A and 5B show an alternative embodiment of an inventive holding device 38. FIG. 5A shows a top view of the holding device 38 from the bottom, wherein no diaphragm actuator is inserted. FIG. 5B shows a lateral sectional view of a portion of the inventive holding device 38, wherein a diaphragm actuator 28 is inserted in the holding device 38 during a method step wherein the inserted diaphragm actuator 28 is connected to a pump diaphragm 27. For the subsequent detailed description of the inventive holding device 38, reference is made to both FIG. 5A and FIG. 5B.

This embodiment of an inventive holding device 38 can be configured without floor, i.e. the holding device 38 comprises no curved spherical cap-shaped floor. Instead, the holding device 38 can comprise a first recess 51a with a first diameter $D_1$, wherein the first recess 51a comprises an edge area 51b where the diaphragm actuator 28 can be arranged. Thus, this first recess 51a may be comparable to a tube portion.

Additionally, the diaphragm actuator 28, when the same is arranged on the edge area 51b, can be deflected at least partly into the first recess 51a. This can particularly be seen in FIG. 5B. Here, the diaphragm actuator 28 is deflected at least partly into the first recess 51a. This can take place, for example by sucking in the diaphragm actuator 28 by means of negative pressure 40. Here, the diaphragm actuator 28 is supported at the edge area 51b of the first recess 51a, such that the deflected diaphragm actuator 28 comprises a dome-shaped deformation or a curve. Thereby, the diaphragm actuator 28 is mechanically biased.

Additionally, the holding device 38 comprises a second recess 52a with a second diameter $D_2$, wherein the second recess 52a comprises an edge area 52b where a pump diaphragm 27 of the micropump 21 can be arranged. The second recess 52a may thus also be comparable to a tube portion.

Additionally, the pump diaphragm 27 can be deflected at least partly into the second recess 52a. This can again particularly be seen in FIG. 5B. Here, the pump diaphragm 27 is deflected at least partly into the second recess 52a. This can take place, for example, by deflecting the pump diaphragm 27 by means of overpressure 36. Here, the pump diaphragm 27 is supported at the edge area 52b of the second recess 52a, such that the deflected pump diaphragm 27 comprises a dome-shaped deformation or a curve.

The curves of the pump diaphragm 27 and the diaphragm actuator 28 can approximately be the same. Thus, the deflected pump diaphragm 27 can easily be connected to the biased diaphragm actuator 28.

According to the invention, this is obtained in that the first diameter $D_1$ of the first recess 51a is smaller than the second diameter $D_2$ of the second recess 52a and that the first recess 51a is arranged within the second recess 52a.

For producing the micropump 21, both the inventive holding device 38 with the above-described curved spherical cap-shaped floor as well as the configuration without a floor described with reference to FIGS. 5A and 5B that may be compared to a tube portion can be used. Regarding the producibility of the holding device 38, the version without floor has the following advantages with respect to the holding device with curved spherical cap-shaped floor.

When the holding device 38 is to have a conic shape, the same is difficult to produce in the desired micrometer range. Here, the conus should correspond to the bending shape of the bias of the diaphragm actuator 28. These are cavities of only 5 µm to 50 µm depth, which, however, should be produced continuously and without voids.

One option of producing geometries with this accuracy is eroding. Thus, for example, the above-mentioned embodiments with curved spherical cap-shaped floor can be produced.

However, during eroding, voids (shrink holes or variations due to the removal of the electrodes) can result due to the process. These problems have already been observed at Fraunhofer EMFT with a tool having three cavities (e.g. for a three-chamber peristaltic pump). Therefore, the tool costs for producing such a tool would be extremely high if it were possible at all to produce a tool having several thousand "exact" cavities.

The configuration of the holding device 38 described with reference to FIGS. 5A and 5B provides a remedy. Here, it can already be sufficient to produce merely the diameters $D_1$, $D_2$ of the edge areas 51b, 52b of the respective depressions 51a, 52a with sufficiently high precision. This lowers the production costs for such a tool significantly.

Thus, the holding device 38 can, for example, be designed such that the pump diaphragm 27 or the diaphragm actuator 28 is only held at the two edge areas 51b, 52b, for example in the shape of two rings (other shapes are also possible). This lowers the risk for voids significantly. The outer or second edge area 52b (e.g. second ring) presses the pump diaphragm 27 to a first level, while the inner or first edge area 51b (e.g. first ring) presses the diaphragm actuator 28 close to the edge of the diaphragm actuator 28 down to a second level. Instead of rings, each edge area can, for example, also consist of n "followers".

As can be seen in FIG. 5A, the two edge areas 51b, 52b are spaced apart in radial direction. In radial direction, the first and second edge area 51b, 52b are spaced apart in the range of several micrometers.

As can be seen in FIG. 5B, the two edge areas 51b, 52b are also spaced apart in axial direction, which is characterized by the measure $Z_1$. This axial direction is also referred to as depth direction. In this depth direction the first and second edge area 51b, 52b are spaced apart in the range of several micrometers.

Here, the radial inner or first edge area 51b is offset axially to the inside with respect to the radial outer or second edge area 52b, i.e. in a direction in which the pump diaphragm 27 is deflected or the diaphragm actuator 28 is biased.

In other words, the edge area 51b of the first recess 51a can be spaced apart from the edge area 52b of the second recess 52a in a depth direction $Z_1$ in which the pump diaphragm 27 and/or the diaphragm actuator 28 can be deflected into the respective recess 51a, 52a.

In a further configuration, the holding device 38 can be configured such that the edge areas 51b, 52b (e.g. rings) can be axially or vertically offset with respect to one another in the micrometer range in z-axis, i.e. in depth direction. In that way, micropumps having different diaphragm and piezo thicknesses can be mounted with a holding device 38.

In other words, for example the edge area 51b of the first recess 51a can be arranged movable relative to the edge area 52b of the second recess 52a, such that a spacing $Z_1$ in the depth direction between the edge area 51b of the first recess 51a and the edge area 52b of the second recess 52a can be varied. For example, the radial inner or edge area 51b of the first recess 51b in axial direction $Z_1$ can be configured in a movable manner. Alternatively or additionally, the radial outer or edge area 52b of the second recess 52a can be configured in a movable manner in axial direction $Z_1$.

Independent of whether the edge areas 51b, 52b of the first and/or second recess 51a, 52b in axial direction are movable or not, the axial spacing $Z_1$ between the bottom of the edge area 51b of the first recess 51a and the bottom of the edge area 52b of the second recess 52a can be selected such that the deflected pump diaphragm 27 comes into contact with the biased diaphragm actuator 28.

In other words, the spacing $Z_1$ in the depth direction between the edge area 51b of the first recess 51a and the edge area 52b of the second recess 52a can be selected such that a pump diaphragm 27 arranged on the edge area 52b of the second recess 52a touches a diaphragm actuator 28 arranged on the edge area 51b of the first recess 51a in a deflected state.

As mentioned above, the edge area 51b of the first recess 51a and/or the edge area 52b of the second recess 52a can be configured in a ring shape. Ring-shaped means that the shape itself is closed. The closed ring-shaped edge area 51b, 52b can have any geometrical shape. The closed ring-shaped edge area 51b, 52b has a circular shape, such that the edge area 51b, 52b forms a circular ring.

Subsequently, the inventive method will be described again in other words, wherein the diaphragm actuator 28 is also referred to as a bending converter or a piezo.

According to the invention, pre-bending of the diaphragm actuator 28 takes place by mechanical means. The pump diaphragm 27 can be inflated by gas pressure on wafer level (or a field of pump chips) so that the same clings to the bending converter that can bend freely or limited by a mechanical shape or by sensors. The pump diaphragm 27 and/or the bending converter can previously be provided with joining means 37, adhesive or low-temperature solder (e.g. by a screen-printing method), so that after inflating the pump diaphragm 27 adhering or joining with the bending converter can take place, for example by temperature application.

This results in the following advantages:
In conventional technology, bias (in the mechanical sense) when applying electrical voltages is limited by the maximum electric breakthrough field strength of the piezo material. The inventive mechanical pre-bending of the diaphragm actuator 28 can exceed this limit and can increase the potential of the bending converter (in the direction of higher deflection and, hence, higher pump volume).

No expensive and interference-prone contact pin fields are needed.

A wafer level process is enabled and the pump chips do not have to be rearranged in a field after sawing.

Sensors enable quality check and adjustment of the mechanical bias.

In metal pumps, undesired bending by mechanical clamping can be prevented.

Subsequently, with reference to FIGS. 3A and 3B, an example for a process flow for piezo assembly with mechanical bias of the piezo will be described:

1) A disc 22 (e.g. wafer) or the field (array) with the pre-produced pump chips is placed on a substrate holder 31 having O-rings 32 at the wafer edge.

Supporting elements 33 such as intermediate ridges, stamps or seals provide for a horizontal rest of the wafer 22 on the substrate holder 31.

2) An adhesive 37 or a low-temperature solder is applied to the piezo crystal and/or the pump diaphragm 27, e.g. in the screen-printing method or other dosing methods.

3) The holding device 38 (e.g., a piezo recess or a piezo holder) with depressions (e.g. in spherical cap-shape) is populated in advance with the respective number of piezos by the pick-and-place method.

Option 1: a vacuum 40 is applied to the piezo holder such that the piezos bend into the respective spherical cap-shaped depressions.

Option 2: the piezos are only inserted (without vacuum).

4) Then, the substrate holder 31 is pressed onto the piezo holder and the substate 22 is subsequently pressurized 36 from the rear (i.e. from the side of the respective pump diaphragms 27 arranged opposite to the piezo holder), such that the shape of the pump diaphragms 27 is adapted to the shape of the pre-bent piezo or such that the pump diaphragms 27 bend the piezos, for example, in a spherical cap shape.

5) Now, the adhesive 37 can be cross-linked via heating wires in the piezo holder. Thereby, temperatures up to close to the Curie temperature of the piezo can be used without the piezo losing bias. Subsequently, the vacuum 40 or the pressure 36 can be released and the wafer compound 22 or the field (array) is populated with the mechanically biased piezos.

The inventive method as well as the inventive holding device 38 offer a definite advantage with respect to methods where the diaphragm actuator 28 is deflected by means of electrical voltage and thereby mechanically biased. In the inventive method, the diaphragm actuator is deflected mechanically, e.g. by means of negative pressure 40.

The difference between a micropump produced with conventional methods according to conventional technology and a micropump produced with an inventive method can, among others, be seen in that the shape of the diaphragm actuator differs. This means the shape of a diaphragm actuator biased by means of electrical voltage differs from the shape of a mechanically biased diaphragm actuator.

Additionally, diaphragm actuators biased by means of electrical voltage show contact traces for applying the electrical bias to the diaphragm actuator.

First tests have shown that the performance data of a micropump produced by applying the inventive method can be higher than those of a conventional micropump having a diaphragm actuator biased by means of electrical voltage.

A micropump produced by applying the inventive method can be used, for example, in the following fields:
micropumps in the medical field
micropumps in the consumer field (e.g. smartphones)
micropumps for smell in virtual reality glasses
micropumps for vacuum applications (e.g. degasser)

Further embodiments of the present invention that can be combined with the embodiments described herein without any limitations relate to:

The holding device 38 described herein, wherein the holding device 38 comprises a fluid terminal 39 fluidically connected to the first recess 51a. A pump, for example a vacuum pump can be connected to this fluid terminal 39. The pump can suck in fluid (e.g. air) existing in the first recess 51a and, can hence generate a fluid pressure that is lower than the ambient atmospheric pressure, by which the diaphragm actuator 28 can be deflected at least partly into the first recess 51a.

A system with a holding device 38 described herein, a substrate holder 31 for receiving a substrate 22, wherein the substrate holder 31 comprises a seal 32 for producing a fluid-tight connection between the substrate holder 31 and the substrate 22 arranged thereon.

The above-stated system, wherein the substrate holder 31 comprises a fluid terminal 35 leading into the space 34 formed between the substrate holder 31 and the substrate 22 arranged thereon and through which fluid can be introduced into this space 34.

The above-stated system, wherein the fluid that can be introduced into the space 34 can be introduced into a space 34 under pressure, wherein the fluid has a fluid pressure that is higher than the ambient atmospheric pressure.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for producing a micropump, the method comprising:
   providing a substrate comprising at least one pump diaphragm for the micropump,
   providing a piezo diaphragm actuator for actuating the pump diaphragm by deflecting the pump diaphragm,
   temporarily arranging, during the production of the micropump, the piezo diaphragm actuator in a holding device,
   aligning the holding device relative to the substrate such that the piezo diaphragm actuator is arranged opposite to the pump diaphragm,
   temporarily applying, during the production of the micropump, a fluid pressure that is higher than an ambient pressure so as to move the pump diaphragm towards the piezo diaphragm actuator, such that the pump diaphragm comes into contact with the piezo diaphragm actuator, until both the pump diaphragm and the piezo diaphragm actuator exhibit a dome-shaped deformation facing a same direction, and
   adhering the deformed piezo diaphragm actuator to the deformed pump diaphragm.

2. The method according to claim 1, wherein the dome-shaped deformation of the piezo diaphragm actuator causes the piezo diaphragm actuator to be mechanically biased.

3. The method according to claim 1, wherein the step of arranging the piezo diaphragm actuator into the holding device comprises:
   inserting the piezo diaphragm actuator in the holding device and applying a mechanical force on the piezo diaphragm actuator such that the piezo diaphragm actuator inserted in the holding device is deformed in a direction away from the pump diaphragm, thereby causing the piezo diaphragm actuator to be mechanically biased.

4. The method according to claim 1, wherein the step of arranging the piezo diaphragm actuator in the holding device comprises:
   generating a negative pressure between the holding device and the piezo diaphragm actuator, whereby the piezo diaphragm actuator is sucked into the holding device and is deformed in a direction away from the pump diaphragm.

5. The method according to claim 1, wherein the pump diaphragm is deflected so far in a direction of the piezo diaphragm actuator that the pump diaphragm clings to the piezo diaphragm actuator that is inserted in the holding device and is deformed as well as mechanically biased.

6. The method according to claim 1, wherein the pump diaphragm is deflected in a direction of the piezo diaphragm actuator such that the pump diaphragm touches the piezo diaphragm actuator inserted in the holding device, and such that the pump diaphragm and the piezo diaphragm actuator are deflected together, causing the piezo diaphragm actuator to be deformed and mechanically biased.

7. The method according to claim 1, wherein the step of providing the substrate comprises:
   arranging the substrate on a substrate holder,
   providing a fluid-tight connection between the substrate and the substrate holder and providing a fluidic connection between the substrate holder and the pump diaphragm, and
   generating the fluid pressure within the fluidic connection such that a pressurized fluid flows through the fluidic connection to the pump diaphragm, thus causing the pump diaphragm to be deflected in a direction of the piezo diaphragm actuator.

8. The method according to claim 1, wherein the fluid pressure comprises an overpressure with respect to the ambient pressure of 0.5 bar to 5 bar.

9. The method according to claim 1, wherein the step of mounting the piezo diaphragm actuator on the pump diaphragm comprises:
   arranging a joining agent on a side of the pump diaphragm facing the piezo diaphragm actuator or on a side of the piezo diaphragm actuator facing the pump diaphragm.

10. The method according to claim 9, wherein the joining agent is a thermosetting joining agent and wherein the step of mounting the piezo diaphragm actuator on the pump diaphragm comprises:
    heating the piezo diaphragm actuator or the pump diaphragm below a Curie temperature of the piezo diaphragm actuator to thermally activate the joining agent.

* * * * *